United States Patent
Suenaga et al.

(10) Patent No.: US 9,073,297 B2
(45) Date of Patent: Jul. 7, 2015

(54) METHOD FOR MANUFACTURING TRANSPARENT, HEAT-RESISTANT GAS-BARRIER FILM

(71) Applicant: MITSUBISHI GAS CHEMICAL COMPANY, INC., Tokyo (JP)

(72) Inventors: Shuya Suenaga, Kanagawa (JP); Yasushi Miki, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/355,692

(22) PCT Filed: Nov. 8, 2012

(86) PCT No.: PCT/JP2012/078959
§ 371 (c)(1),
(2) Date: May 1, 2014

(87) PCT Pub. No.: WO2013/069725
PCT Pub. Date: May 16, 2013

(65) Prior Publication Data
US 2014/0322444 A1  Oct. 30, 2014

(30) Foreign Application Priority Data
Nov. 11, 2011  (JP) .................. 2011-248064

(51) Int. Cl.
*B32B 37/00* (2006.01)
*B32B 33/00* (2006.01)
*B05D 3/02* (2006.01)
*B32B 27/00* (2006.01)
*B32B 37/24* (2006.01)

(52) U.S. Cl.
CPC .......... *B32B 33/00* (2013.01); *B32B 2037/243* (2013.01); *B32B 2307/306* (2013.01); *B32B 2307/412* (2013.01); *B32B 2307/7242* (2013.01); *B32B 2379/08* (2013.01); *B05D 3/0254* (2013.01); *B05D 2505/50* (2013.01); *B32B 27/00* (2013.01)

(58) Field of Classification Search
CPC ................................ B32B 33/00; B32B 37/00
See application file for complete search history.

(56) References Cited

U.S. PATENT DOCUMENTS

| 5,747,623 | A | 5/1998 | Matsuo et al. | |
| 6,083,860 | A | 7/2000 | Matsuo et al. | |
| 6,501,014 | B1 | 12/2002 | Kubota et al. | |
| 6,599,622 | B1* | 7/2003 | Chu et al. ...................... | 428/323 |
| 7,364,771 | B2* | 4/2008 | Tajiri et al. .................... | 427/240 |
| 7,666,490 | B1* | 2/2010 | Iseki et al. .................... | 428/156 |
| 2003/0104232 | A1 | 6/2003 | Kihara et al. | |
| 2005/0279255 | A1 | 12/2005 | Suzuki et al. | |
| 2006/0117799 | A1* | 6/2006 | Miyahara et al. ............... | 65/404 |
| 2007/0048458 | A1* | 3/2007 | Haruta et al. ................. | 428/1.31 |
| 2008/0020217 | A1 | 1/2008 | Makinoshima et al. | |
| 2010/0166977 | A1 | 7/2010 | Brand et al. | |
| 2012/0021234 | A1 | 1/2012 | Fukukawa et al. | |
| 2013/0115423 | A1* | 5/2013 | Ii et al. .......................... | 428/141 |
| 2013/0252002 | A1* | 9/2013 | Suzuki .......................... | 428/448 |
| 2014/0322478 | A1* | 10/2014 | Mori .............................. | 428/76 |

FOREIGN PATENT DOCUMENTS

| CN | 1417809 | 5/2003 |
| CN | 1694936 | 11/2005 |
| CN | 101160202 | 4/2008 |
| CN | 101233200 | 7/2008 |
| EP | 2455220 | 5/2012 |
| JP | 8-112879 | 5/1996 |
| JP | 8-281861 | 10/1996 |
| JP | 9-199740 | 7/1997 |
| JP | 410016150 | * 1/1998 |
| JP | 2001-111076 | 4/2001 |
| JP | 2003-141936 | 5/2003 |
| JP | 2006-37079 | 2/2006 |
| JP | 2006-82309 | 3/2006 |
| JP | 2007-237588 | 9/2007 |
| JP | 2009-503157 | 1/2009 |
| JP | 2009-255040 | 11/2009 |
| JP | 2010-100674 | 5/2010 |
| JP | 2011-74278 | 4/2011 |
| WO | 2011/074363 | 6/2011 |

OTHER PUBLICATIONS

Di, Lan-Bo, et al., "Atmospheric-pressure plasma CVD of TiO2 photocatalytic films using surface dielectric barrier discharge". J. Phys. D: Appl. Phys. 42 (2009) 032001 (pp. 1-4).*

Dieguez, A., et al., "Nanoparticle engineering for gas sensor optimisation: improved sol-gel fabricated nanocrystalline SnO2 thick film gas sensor for NO2 detection by calcination, catalytic metal introduction and grinding treatments". Sensors and Actuators B 60 (1999) 125-137.*

(Continued)

Primary Examiner — Bret Chen
(74) Attorney, Agent, or Firm — Greenblum & Bernstein, P.L.C.

(57) ABSTRACT

The present invention provides a process for producing a transparent heat-resistant gas-barrier film capable of exhibiting a good gas-barrier property and maintaining good properties even after heat-treated at a temperature of 250° C. or higher, in a simple manner at low costs without need of a large size facility and a number of steps. The process for producing a transparent heat-resistant gas-barrier film according to the present invention includes the steps of coating a polysilazane-containing solution onto at least one surface of a transparent polyimide film formed of a polyimide containing a specific repeated unit; and calcining the coated solution at a temperature of 180° C. or higher to laminate a silicon oxide layer obtained by the calcination on the transparent polyimide film.

8 Claims, No Drawings

(56) References Cited

OTHER PUBLICATIONS

China Office action in 201280054747.4, mail date is Dec. 31, 2014.
Search report from International Patent Appl. No. PCT/JP2012/078959, mail date is Feb. 5, 2013.

Hu L et al., "A Polysilazane coating protecting polyimide from atomic oxygen and vacuum ultraviolet radiation erosion", Surface and Coatings Technology, Elsivier, Amsterdam, NL, vol. 203, No. 22, XP026191625, Aug. 15, 2009, pp. 3338-3343.
Search report from E.P.O. in EP 128474830.0, mail date is Apr. 28, 2015.

* cited by examiner

METHOD FOR MANUFACTURING TRANSPARENT, HEAT-RESISTANT GAS-BARRIER FILM

TECHNICAL FIELD

The present invention relates to a process for producing a transparent heat-resistant gas-barrier film, and more particularly, to a process for producing a transparent heat-resistant gas-barrier film having a good gas-barrier property in a simple manner at low costs without need of a large size facility and a number of steps.

BACKGROUND ART

The substrate for electronic devices such as a substrate for displays has been conventionally formed of glass because of good gas-barrier property and heat resistance thereof. In recent years, earnest studies on flexible displays produced from a plastic film have been made since the plastic film has excellent properties such as light weight, unbreakableness and excellent processability. However, the plastic film is readily susceptible to penetration of gases such as water vapor and suffers from drawbacks such as insufficient heat resistance, etc., as compared to glass, and therefore has many problems upon practical use.

To solve these problems, Patent Document 1 discloses a gas-barrier film with a laminated structure including a silicon oxide layer formed on a transparent polymer film by a plasma chemical vapor deposition method, and another silicon oxide layer obtained by coating a polysilazane-containing solution thereon and then heat-treating the coated solution. However, in order to form a film of an inorganic compound by the plasma chemical vapor deposition method, the use of a large size vacuum apparatus is needed, and there also tends to arise such a problem that the costs for production of the film are hardly reduced owing to a low production rate thereof.

Patent Document 2 discloses a gas-barrier film including a base material, and a barrier layer formed on at least one surface of the base material by subjecting a polysilazane film to plasma treatment. However, in the method, the use of an apparatus for the plasma treatment is inevitably needed, and the method further has such as a problem that the resulting film is considerably deteriorated in barrier property after the heat-treatment step depending upon a kind of base material used.

Patent Document 3 discloses a process for producing a flexible gas-barrier film which includes the steps of coating a polymer having a silazane skeleton as a base unit on a resin substrate and irradiating vacuum ultraviolet rays to the coated polymer to laminate a film of the polymer on the resin substrate. However, the process of Patent Document 3 needs a facility for irradiating vacuum ultraviolet rays and further has such a problem that a large number of laminating steps are required for laminating the polymer film.

CITATION LIST

Patent Literature

Patent Document 1: JP 8-281861A
Patent Document 2: JP 2007-237588A
Patent Document 3: JP 2009-255040A

SUMMARY OF INVENTION

Technical Problem

An object of the present invention is to provide a process for producing a transparent heat-resistant gas-barrier film having a good gas-barrier property in a simple manner at low costs without need of a large size facility and a number of steps which is capable of maintaining good properties even after heat-treated at a temperature of 250° C. or higher.

Solution to Problem

As a result of extensive and intensive researches for solving the above conventional problems, the present inventors have found that when using a transparent polyimide film containing a repeating unit having a specific tetracarboxylic acid structure and exhibiting an excellent heat resistance as a substrate and laminating a silicon oxide layer obtained by calcining a polysilazane solution coated thereon at a temperature of 180° C. or higher on the substrate, it is possible to produce a film having a dense silicon oxide structure which can exhibit an excellent gas-barrier property, without need of specific facilities or treatments. The present invention has been accomplished on the basis of the above finding.

That is, the present invention relates to a process for producing a transparent heat-resistant gas-barrier film, including the steps of:

coating a polysilazane-containing solution onto at least one surface of a transparent polyimide film formed of a polyimide containing a repeated unit represented by the following formula (I); and calcining the coated solution at a temperature of 180° C. or higher to laminate a silicon oxide layer obtained by the calcination on the transparent polyimide film.

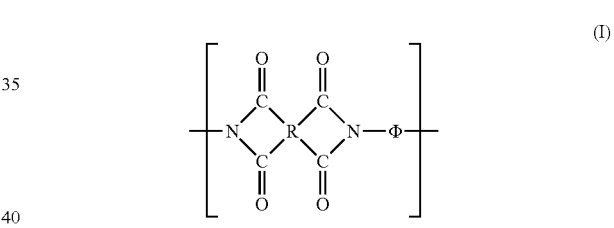

wherein R is a $C_4$ to $C_{10}$ tetravalent group having a cyclic structure, an acyclic structure or both a cyclic structure and an acyclic structure; and $\phi$ is a $C_2$ to $C_{39}$ divalent linking group containing an aliphatic structural unit, an alicyclic structural unit, an aromatic structural unit, an organosiloxane structural unit or a combination or a repeating structure of these structural units, and may contain at least one group selected from the group consisting of —O—, —SO$_2$—, —CO—, —CH$_2$—, —C(CH$_3$)$_2$—, —C$_2$H$_4$O— and —S— in a main chain thereof.

Advantageous Effects of Invention

In the process for producing a transparent heat-resistant gas-barrier film according to the present invention, there is no need of a large size vacuum apparatus such as those used for vacuum vapor deposition or chemical vapor deposition or a facility for plasma treatment or irradiation with ultraviolet rays, and it is possible to obtain a transparent heat-resistant gas-barrier film having such a structure that a dense silicon oxide layer is laminated on a transparent polyimide substrate having a glass transition temperature of 250° C. or higher and an excellent heat resistance which is capable of exhibiting a good gas-barrier property, in particular, a water vapor-barrier property, and maintaining good properties and configuration even after heat-treated at a temperature of 250° C. or higher.

DESCRIPTION OF EMBODIMENTS

The process for producing a transparent heat-resistant gas-barrier film according to the present invention includes the steps of coating a polysilazane-containing solution onto at least one surface of a transparent polyimide film formed of a polyimide containing a repeated unit represented by the following formula (I); and calcining the coated solution at a temperature of 180° C. or higher to laminate a silicon oxide layer obtained by the calcination on the transparent polyimide film.

The polyimide containing a repeated unit represented by the formula (I) is explained below.

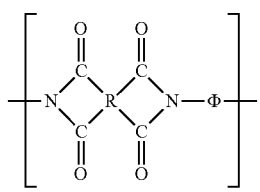

(I)

In the formula (I), R is a $C_4$ to $C_{10}$ tetravalent group having a cyclic structure, an acyclic structure or both a cyclic structure and an acyclic structure, and preferably a $C_4$ to $C_{10}$ tetravalent group having an alicyclic structure.

R in the formula (I) is a tetravalent group formed by removing four hydrogen atoms from a compound having any of the above structures. Examples of the compound include cyclohexane, cyclopentane, cyclobutane, bicyclopentane, norbornene, and alkyl-substituted products or halogen-substituted products of these compounds. Among these compounds, cyclohexane is especially preferred.

In the formula (I), φ is a $C_2$ to $C_{39}$ divalent linking group containing an aliphatic structural unit, an alicyclic structural unit, an aromatic structural unit, an organosiloxane structural unit or a combination or a repeating structure of these structural units, and may contain at least one group selected from the group consisting of —O—, —$SO_2$—, —CO—, —$CH_2$—, —$C(CH_3)_2$—, —$C_2H_4O$— and —S— in a main chain thereof.

Examples of the linking group φ include cyclohexane, dicyclohexyl methane, dimethyl cyclohexane, isophorone, norbornane, and alkyl-substituted products or halogen-substituted products of these compounds; benzene, naphthalene, biphenyl, diphenyl methane, diphenyl ether, diphenyl sulfone, benzophenone, and alkyl-substituted products or halogen-substituted products of these compounds; and divalent groups formed by removing two hydrogen atoms from compounds such as organo(poly)siloxanes. More specifically, φ is preferably a $C_6$ to $C_{27}$ divalent group represented by the following structural formulae.

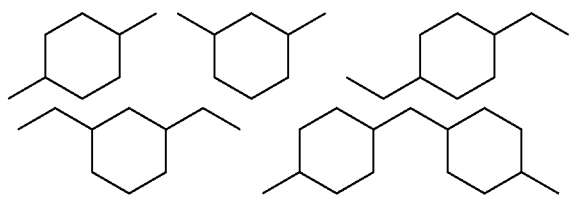

-continued

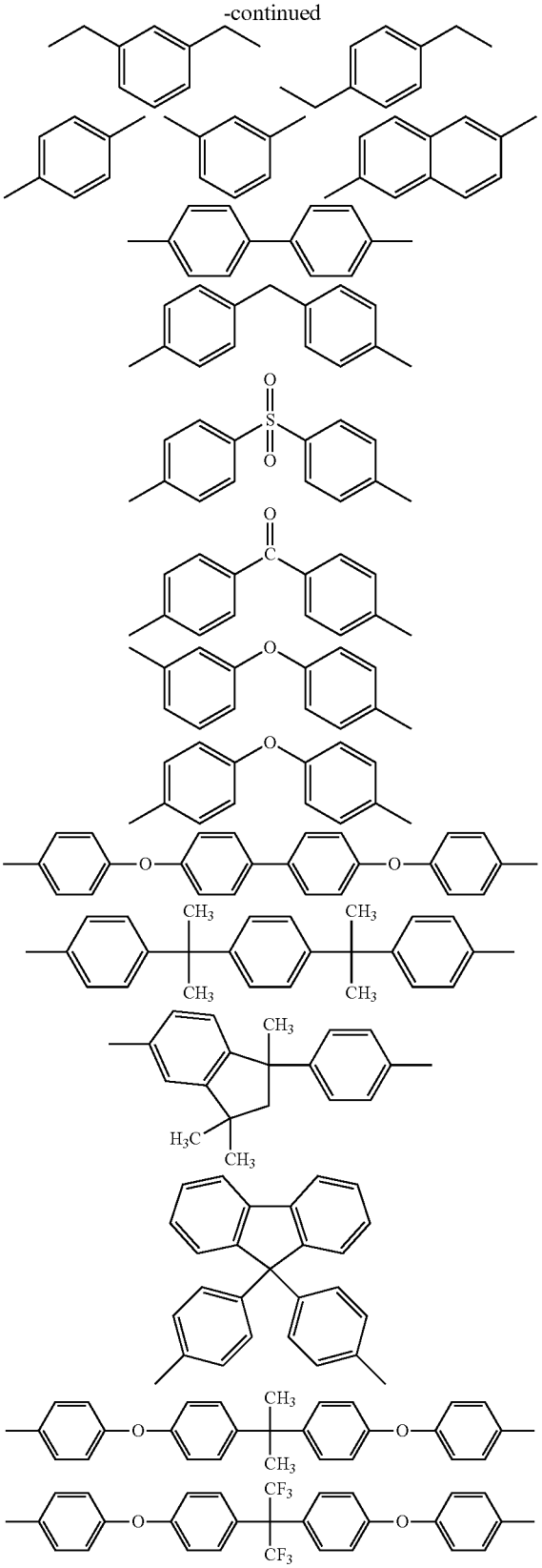

The content of the repeating unit represented by the formula (I) in the polyimide is preferably from 10 to 100 mol %, more preferably from 50 to 100 mol % and most preferably 100 mol % on the basis of whole repeating units in the polyimide. The number of the repeating units represented by the formula (I) in the polyimide is preferably from 10 to 2000 and more preferably from 20 to 200.

The polyimide used in the present invention may be produced by reacting a tetracarboxylic acid component and a diamine-based component (such as a diamine and derivatives thereof). Examples of the tetracarboxylic acid component include cyclohexanetetracarboxylic acid, cyclohexanetetracarboxylic acid esters, cyclohexanetetracarboxylic acid dianhydride, cyclobutanetetracarboxylic acid, cyclobutanetetracarboxylic acid esters, cyclobutanetetracarboxylic acid dianhydride, cyclopentanetetracarboxylic acid, cyclopentanetetracarboxylic acid esters, cyclopentanetetracarboxylic acid dianhydride and bicyclopentanetetracarboxylic acid dianhydride. Of these tetracarboxylic acid components, preferred are cyclohexanetetracarboxylic acid dianhydride, cyclobutanetetracarboxylic acid dianhydride and cyclopentanetetracarboxylic acid dianhydride, and more preferred is cyclohexanetetracarboxylic acid dianhydride. Meanwhile, the tetracarboxylic acid component may contain a regioisomer thereof.

Specific examples of the tetracarboxylic acid component include 1,2,4,5-cyclohexanetetracarboxylic acid, 1,2,4,5-cyclohexanetetracarboxylic acid dianhydride, 1,2,4,5-cyclohexanetetracarboxylic acid methyl ester, 1,2,3,4-butanetetracarboxylic acid, 1,2,3,4-butanetetracarboxylic acid dianhydride, 1,2,3,4-butanetetracarboxylic acid methyl ester, 1,2,3,4-cyclobutanetetracarboxylic acid, 1,2,3,4-cyclobutanetetracarboxylic acid dianhydride, 1,2,3,4-cyclobutanetetracarboxylic acid methyl ester, 1,2,4,5-cyclopentanetetracarboxylic acid, 1,2,4,5-cyclopentanetetracarboxylic acid dianhydride, 1,2,4,5-cyclopentanetetracarboxylic acid methyl ester, 3-carboxymethyl-1,2,4-cyclopentanetricarboxylic acid, bicyclo[2.2.2]oct-7-ene-2,3,5,6-tetracarboxylic acid, bicyclo[2.2.2]oct-7-ene-2,3,5,6-tetracarboxylic acid dianhydride, bicyclo[2.2.2]oct-7-ene-2,3,5,6-tetracarboxylic acid methyl ester, dicyclohexyltetracarboxylic acid, dicyclohexyltetracarboxylic acid dianhydride and dicyclohexyltetracarboxylic acid methyl ester.

Polyimides having a cyclohexanetetracarboxylic acid skeleton among those produced using the above tetracarboxylic acid components can be readily increased in molecular weight thereof and can be readily formed into a flexible film. In addition, the polyimides having a cyclohexanetetracarboxylic acid skeleton can exhibit a sufficiently high solubility in solvents and therefore is advantageous in view of a good moldability or processability of the resulting film.

The aforementioned tetracarboxylic acid component used in the present invention may also contain the other tetracarboxylic acids or derivatives thereof unless a solubility of the obtained polyimide in solvents as well as a flexibility and a thermocompression property of the film are adversely affected by inclusion of these compounds. For example, the tetracarboxylic acid component may contain at least one compound selected from the group consisting of pyromellitic acid, 3,3',4,4'-biphenyl tetracarboxylic acid, 2,3,3',4'-biphenyl tetracarboxylic acid, 2,2-bis(3,4-dicarboxyphenyl) propane, 2,2-bis(2,3-dicarboxyphenyl) propane, 2,2-bis(3,4-dicarboxyphenyl)-1,1,1,3,3,3-hexafluoropropane, 2,2-bis(2,3-dicarboxyphenyl)-1,1,1,3,3,3-hexafluoropropane, bis(3,4-dicarboxyphenyl)sulfone, bis(3,4-dicarboxyphenyl)ether, bis(2,3-dicarboxyphenyl)ether, 3,3',4,4'-benzophenone tetracarboxylic acid, 2,2',3,3'-benzophenone tetracarboxylic acid, 4,4-(p-phenylenedioxy)diphthalic acid, 4,4-(m-phenylenedioxy)diphthalic acid, ethylene tetracarboxylic acid, 1,1-bis(2,3-dicarboxyphenyl)ethane, bis(2,3-dicarboxyphenyl) methane, bis(3,4-dicarboxyphenyl) methane and derivatives thereof.

Examples of the diamine-based component include diamines, diisocyanates and diaminodisilanes. Among these diamine-based components, preferred are diamines. The content of the diamine-based component in the polyimide is preferably 50 mol % or more (inclusive of 100 mol %).

The diamines may be an aliphatic diamine, an aromatic diamine or a mixture thereof. Meanwhile, the "aromatic diamine" as used herein means a diamine containing an amino group directly bonded to an aromatic ring, which may also contain an aliphatic group, an alicyclic group or the other substituent group as a part of a structure thereof. The "aliphatic diamine" as used herein means a diamine containing an amino group directly bonded to an aliphatic group or an alicyclic group, which may also contain an aromatic group or the other substituent group as a part of a structure thereof.

In general, when using an aliphatic diamine as a constituent of the polyimide, a polyamic acid as an intermediate product of the polyimide and the aliphatic diamine are reacted to form a strong complex thereof, so that a high-molecular weight polyimide tends to be hardly produced. For this reason, it is required to take a measure of using a specific solvent in which the complex has a relatively high solubility, for example, such as cresol. However, when cyclohexanetetracarboxylic acid or derivatives thereof and the aliphatic diamine are used as the constitutional components of the polyimide, a complex having a relatively weak bonding force between the polyamic acid and the aliphatic diamine is produced, so that the polyimide can be readily increased in molecular weight thereof.

Examples of the aliphatic diamine include 4,4'-diaminodicylcohexyl methane, 1,3-bis(aminomethyl)cyclohexane, 1,4-bis(aminomethyl)cyclohexane, m-xylylenediamine, p-xylylenediamine, isophoronediamine, norbornanediamine and siloxanediamines.

Examples of the aromatic diamine include 4,4'-diaminodiphenyl ether, 4,4'-diaminodiphenyl methane, 4,4'-diaminodiphenyl sulfone, m-phenylene diamine, p-phenylene diamine, diaminobenzophe none, 2,6-diaminonaphthalene and 1,5-diaminonaphthalene.

In the present invention, the transparent polyimide film formed of the above polyimide preferably has a glass transition temperature of 250° C. or higher as measured by a differential scanning calorimetry and a total light transmittance of 80% or more, and more preferably has a glass transition temperature of 280° C. or higher and a total light transmittance of 85% or more.

The polysilazane used in the present invention is preferably a perhydropolysilazane represented by the formula of $H_3Si(NHSiH_2)_xNHSiH_3$ wherein x is an integer of 1 to 1000, and may also be an organopolysilazane obtained by replacing a part or whole of hydrogen atoms of the perhydropolysilazane with an organic group such as an alkyl group. With respect to the composition of the polysilazane, the polysilazane may be used singly or two or more polysilazanes may be used in the form of a mixture of any two or more thereof.

Examples of the organic solvent used for dissolving and dispersing the polysilazane therein include benzene, toluene, xylene, diethyl ether, tetrahydrofuran, methylene chloride and carbon tetrachloride. These organic solvents may be used singly or in the form of a mixture of any two or more thereof.

In the present invention, the polysilazane is dissolved in the above solvent, and the resulting solution is coated onto a transparent polyimide film as a substrate, and after the solvent is evaporated therefrom, the obtained coating layer is subjected to calcination treatment to thereby obtain a silicon oxide layer formed on the substrate. In this case, in order to obtain silicon oxide as an inorganic substance, it is generally required to heat the coating layer at a temperature of 450° C. or higher. However, when using a catalyst such as an amine and a transition metal in the above treatment, it is possible to obtain a material extremely close to the inorganic silicon oxide even when treated at a relatively low temperature. In order to reduce the temperature of conversion to the silicon oxide, form a dense structure and attain a good gas-barrier property, it is preferred that the polysilazane-containing solution contains a palladium catalyst.

The thickness of the silicon oxide layer formed from the polysilazane-containing solution is preferably from 0.1 to 2.0 μm, more preferably from 0.3 to 1.8 μm and still more preferably from 0.3 to 1.0 μm. When the thickness of the silicon oxide layer is 0.1 μm or more, it is possible to obtain a uniform silicon oxide layer having a good gas-barrier property. On the other hand, when the thickness of the silicon oxide layer is 2.0 μm or less, it is possible to prevent the resulting film from being adversely influenced by an internal stress generated therein owing to the conversion to the silicon oxide and suffering from occurrence of cracks.

The coating method for coating the polysilazane-containing solution is not particularly limited, and any conventional coating methods can be used therefor. Examples of the coating method include an ink-jetting method, a spin-coating method, a casting method, a micro-gravure coating method, a gravure coating method, a bar coating method, a roll coating method, a wire bar coating method, a dip coating method, a spray coating method, a screen printing method, a flexographic printing method and a die coating method.

The calcination temperature after being coated is 180° C. or higher and preferably from 200 to 250° C.

In addition, the transparent heat-resistant gas-barrier film obtained according to the production process of the present invention is enhanced in surface smoothness as compared to those films having a silicon oxide layer laminated by the other methods such as a sputtering method. The reason therefor is considered to be that the silicon oxide layer formed by the production process of the present invention is denser than those formed by the other methods.

The production process of the present invention may further include the step of laminating a layer formed of silicon oxide and/or silicon oxynitride on the above silicon oxide layer formed by the production process of the present invention, by a physical vapor deposition method or a chemical vapor deposition method in order to further enhance a gas-barrier property of the resulting film.

In addition, the production process of the present invention may further include the step of laminating a transparent conductive film layer formed of a mixture of indium oxide and tin oxide or a transparent conductive film layer formed of zinc oxide on the silicon oxide layer.

Further, the obtained transparent heat-resistant gas-barrier film may be used as a member for electronic devices.

EXAMPLES

The present invention will be described in more detail below by referring to the following examples. It should be noted, however, that the following examples are only illustrative and not intended to limit the invention thereto.

The films obtained in the respective Examples and Comparative Examples were evaluated by the following methods.
(1) Glass Transition Temperature
The DSC measurement of the film was carried out at a temperature rise rate of 10° C./min using a differential scanning calorimeter ("DSC-6220") available from S.I.I. Nano Technology Inc., to measure a glass transition temperature thereof.
(2) Total Light Transmittance and Haze
The total light transmittance and haze of the film were measured using a color difference/turbidity simultaneous measurement apparatus ("COH-400") available from Nippon Denshoku Kogyo Co., Ltd.
(3) Water Vapor Transmission Rate
The water vapor transmission rate was measured under the conditions of 40° C. and 90% RH using "PERMATRAN-W 1/50" available from MOCON Inc.
(4) Surface Smoothness
Using a scanning probe microscope (measuring range: 5 μm×5 μm), Ra (average surface roughness), P-V (maximum height difference) and Rz (ten point average roughness) were measured.

Reference Example 1

Synthesis of 1,2,4,5-Cyclohexane Tetracarboxylic Acid Dianhydride

A 5 L-capacity Hastelloy (HC22) autoclave was charged with 552 g of pyromellitic acid, 200 g of a catalyst prepared by supporting rhodium on activated carbon (available from N.E. Chemcat Corp.) and 1656 g of water, and while stirring the contents of the autoclave, an interior of the reaction vessel was replaced with a nitrogen gas. Then, the interior of the reaction vessel was replaced with a hydrogen gas until a hydrogen pressure in the reaction vessel reached 5.0 MPa and an inside temperature of the reaction vessel was raised up to 60° C. The contents of the autoclave were reacted for 2 hours while maintaining a hydrogen pressure in the autoclave at 5.0 MPa. The hydrogen gas in the reaction vessel was replaced with a nitrogen gas, and the obtained reaction solution was withdrawn from the autoclave. The thus obtained reaction solution was subjected to hot filtration to separate the catalyst therefrom. The resulting filtrate was concentrated by evaporating water therefrom under reduced pressure using a rotary evaporator to precipitate crystals, and the resulting slurry was subjected to solid-liquid separation at room temperature to separate the precipitated crystals therefrom. The thus obtained crystals were dried to obtain 481 g of 1,2,4,5-cyclohexane tetracarboxylic acid (yield: 85.0%).

Successively, 450 g of 1,2,4,5-cyclohexane tetracarboxylic acid thus obtained and 4000 g of acetic anhydride were charged into a 5 L glass separable flask (equipped with a Dimroth condenser), and while stirring the contents of the flask, an inside atmosphere of the reaction vessel was replaced with a nitrogen gas. The contents of the flask were heated to a refluxing temperature of the solvent in a nitrogen gas atmosphere, and the solvent was refluxed for 10 minutes. Then, the contents of the flask were cooled to room temperature while stirring to precipitate crystals. The resulting reaction slurry was subjected to solid-liquid separation to separate the precipitated crystals therefrom, and the crystals thus separated were dried to obtain primary crystals. Further, the mother liquid separated from the crystals was concentrated under reduced pressure using a rotary evaporator to precipitate crystals. The resulting reaction slurry was subjected to solid-liquid separation to separate the precipitated crystals therefrom, and the crystals thus separated were dried to obtain secondary crystals. As a sum of the primary and secondary crystals, 1,2,4,5-cyclohexane tetracarboxylic acid dianhydride was obtained in an amount of 375 g in total (yield of the anhydride: 96.6%).

Reference Example 2

Synthesis of Polyimide

A 500 mL five-necked flask equipped with a thermometer, a stirrer, a nitrogen inlet tube, a dropping funnel with a bypass tube, a Dean-Stark device and a condenser was charged with 12.1 g (0.035 mol) of 1,4-bis(4-amino-α,α-dimethylbenzyl) benzene (BisA-P), 5.5 g (0.015 mol) of 4,4'-bis(4-aminophenoxy)biphenyl (BAPB) and 85 g of N-methyl-2-pyrrolidone as a solvent under a nitrogen flow, and the contents of the flask were dissolved. Then, 11.2 g (0.05 mol) of 1,2,4,5-cyclohexane tetracarboxylic acid dianhydride synthesized in Reference Example 1 were added in split parts in a solid state as such to the resulting solution at room temperature over 1 hour, and the resulting mixture was stirred at room temperature for 2 hours. Next, 30.0 g of xylene as an azeotropic dehydration solvent were added to the mixture, and the obtained solution was heated to 180° C. and reacted at that temperature for 3 hours, and further xylene was refluxed with the Dean-Stark apparatus to separate water produced by azeotropy from the reaction solution. After 3 hours, it was confirmed that water was completely distilled off, and then the obtained reaction solution was heated to 190° C. over 1 hour to distil off and recover 29.0 g of xylene therefrom. Then, the contents of the flask were air-cooled until an inside temperature of the flask reached 60° C., and the resulting polyimide organic solvent solution was withdrawn therefrom. The thus obtained polyimide organic solvent solution was coated onto a glass plate, and heated on a hot plate at 90° C. for 1 hour to evaporate the solvent therefrom. The resulting coating layer was released from the glass plate to thereby obtain a self-supporting film. The resulting self-supporting film was fixed to stainless steel fixtures and heated in a hot air dryer at 220° C. for 2 hours to further evaporate the solvent therefrom, thereby obtaining a 110 μm-thick light-brown flexible film. As a result of measuring an IR spectrum of the resulting film, the characteristic absorption of an imide ring was observed at ν (C=O) 1770, 1704 (cm$^{-1}$). Therefore, it was determined that the film was formed of a polyimide containing repeating units represented by the following formulae (A) and (A').

The obtained film had a glass transition temperature of 300° C. In addition, it was confirmed that the film had a total light transmittance as high as 91% as measured according to JIS K7105.

The polyimide film was heat-treated in air at 220° C. for 4 hours to measure a total light transmittance thereof before and after the heat treatment. As a result, it was confirmed that the total light transmittance of the heat-treated film was 91% and therefore kept unchanged, and the film was free from undesired coloration even when observed by naked eyes. In addition, the polyimide film was subjected to high-energy light treatment in air (temperature: 60° C.) by irradiating the film with light from a 200 W high-pressure mercury lamp as a light source for 1000 hours to measure a total light transmittance thereof before and after the high-energy light treatment. As a result, it was also confirmed that the total light transmittance of the thus treated film was 91% and therefore kept unchanged, and the film was free from undesired coloration even when observed by naked eyes.

Reference Example 3

Synthesis of Polyimide

A 500 mL five-necked flask equipped with a thermometer, a stirrer, a nitrogen inlet tube, a dropping funnel with a bypass tube, a Dean-Stark device and a condenser was charged with 10.0 g (0.05 mol) of 4,4'-diaminodiphenyl ether and 85 g of N-methyl-2-pyrrolidone as a solvent under a nitrogen flow, and the contents of the flask were dissolved. Then, 11.2 g (0.05 mol) of 1,2,4,5-cyclohexane tetracarboxylic acid dianhydride synthesized in Reference Example 1 were added in split parts in a solid state as such to the resulting solution at room temperature over 1 hour, and the resulting mixture was stirred at room temperature for 2 hours. Next, 30.0 g of xylene as an azeotropic dehydration solvent were added to the mixture, and the obtained solution was heated to 180° C. and reacted at that temperature for 3 hours, and further xylene was refluxed with the Dean-Stark apparatus to separate water produced by azeotropy from the reaction solution. After 3 hours, it was confirmed that water was completely distilled

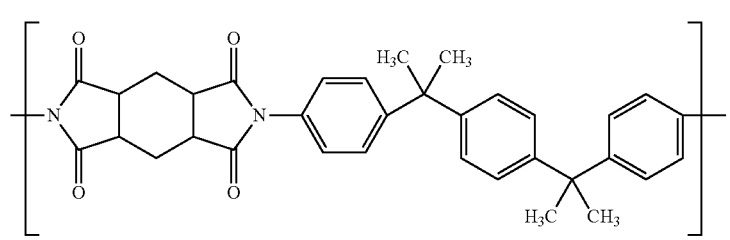

(A)

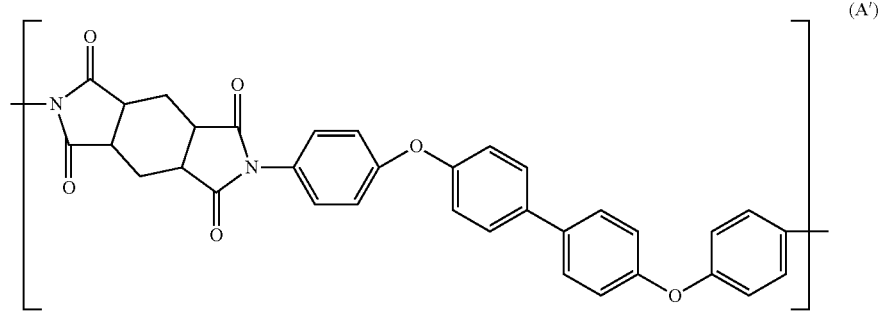

(A')

off, and then the obtained reaction solution was heated to 190° C. over 1 hour to distil off and recover 29.0 g of xylene therefrom. Then, the contents of the flask were air-cooled until an inside temperature of the flask reached 60° C., and the resulting polyimide organic solvent solution was withdrawn therefrom. The thus obtained polyimide organic solvent solution was coated onto a glass plate, and heated on a hot plate at 90° C. for 1 hour to evaporate the solvent therefrom. The resulting coating layer was released from the glass plate to thereby obtain a self-supporting film. The resulting self-supporting film was fixed to stainless steel fixtures and heated in a hot air dryer at 220° C. for 2 hours to further evaporate the solvent therefrom, thereby obtaining a 100 μm-thick light-brown flexible film. As a result of measuring an IR spectrum of the resulting film, the characteristic absorption of an imide ring was observed at ν (C=O) 1772, 1700 (cm$^{-1}$). Therefore, it was determined that the film was formed of a polyimide containing a repeating unit represented by the following formula (B).

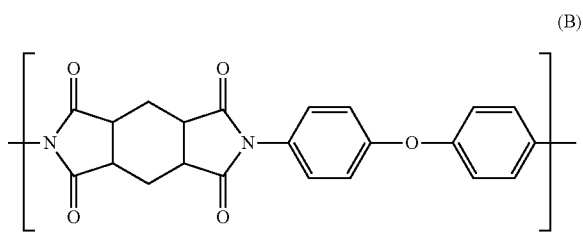

(B)

The obtained film had a glass transition temperature of 315° C. In addition, it was confirmed that the film had a total light transmittance as high as 90% as measured according to JIS K7105.

The polyimide film was heat-treated in air at 220° C. for 4 hours to measure a total light transmittance thereof before and after the heat treatment. As a result, it was confirmed that the total light transmittance of the heat-treated film was 90% and therefore kept unchanged, and the film was free from undesired coloration even when observed by naked eyes. In addition, the polyimide film was subjected to high-energy light treatment in air (temperature: 60° C.) by irradiating the film with light from a 200 W high-pressure mercury lamp as a light source for 1000 hours to measure a total light transmittance thereof before and after the high-energy light treatment. As a result, it was also confirmed that the total light transmittance of the thus treated film was 90% and therefore kept unchanged, and the film was free from undesired coloration even when observed by naked eyes.

Reference Example 4

Synthesis of Polyimide

A 500 mL five-necked flask equipped with a thermometer, a stirrer, a nitrogen inlet tube, a dropping funnel with a bypass tube, a Dean-Stark apparatus and a condenser was charged with 20.5 g (0.05 mol) of 2,2-bis[4-(4-aminophenoxy)phenyl]propane and 85 g of N-methyl-2-pyrrolidone as a solvent under a nitrogen flow, and the contents of the flask were dissolved. Then, 11.2 g (0.05 mol) of 1,2,4,5-cyclohexane tetracarboxylic acid dianhydride synthesized in Reference Example 1 were added in split parts in a solid state as such to the resulting solution at room temperature over 1 hour, and the resulting mixture was stirred at room temperature for 2 hours. Next, 30.0 g of xylene as an azeotropic dehydration solvent were added to the mixture, and the obtained solution was heated to 180° C. and reacted at that temperature for 3 hours, and further xylene was refluxed with the Dean-Stark apparatus to separate water produced by azeotropy from the reaction solution. After 3 hours, it was confirmed that water was completely distilled off, and then the obtained reaction solution was heated to 190° C. over 1 hour to distil off and recover 29.0 g of xylene therefrom. Then, the contents of the flask were air-cooled until an inside temperature of the flask reached 60° C., and the resulting polyimide organic solvent solution was withdrawn therefrom. The thus obtained polyimide organic solvent solution was coated onto a glass plate, and heated on a hot plate at 90° C. for 1 hour to evaporate the solvent therefrom. The resulting coating layer was released from the glass plate to thereby obtain a self-supporting film. The resulting self-supporting film was fixed to stainless steel fixtures and heated in a hot air dryer at 220° C. for 2 hours to further evaporate the solvent therefrom, thereby obtaining a 100 μm-thick light-brown flexible film. As a result of measuring an IR spectrum of the resulting film, the characteristic absorption of an imide ring was observed at ν (C=O) 1773, 1702 (cm$^{-1}$). Therefore, it was determined that the film was formed of a polyimide containing a repeating unit represented by the following formula (C).

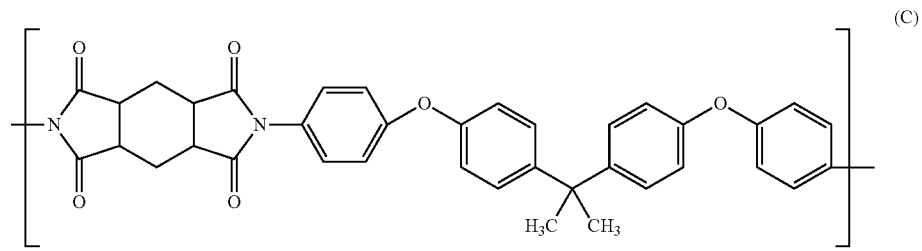

(C)

The obtained film had a glass transition temperature of 260° C. In addition, it was confirmed that the film had a total light transmittance as high as 90% as measured according to JIS K7105.

The polyimide film was heat-treated in air at 220° C. for 4 hours to measure a total light transmittance thereof before and after the heat treatment. As a result, it was confirmed that the total light transmittance of the heat-treated film was 90% and therefore kept unchanged, and the film was free from undesired coloration even when observed by naked eyes. In addition, the polyimide film was subjected to high-energy light treatment in air (temperature: 60° C.) by irradiating the film with light from a 200 W high-pressure mercury lamp as a light source for 1000 hours to measure a total light transmittance thereof before and after the high-energy light treatment. As a result, it was also confirmed that the total light transmittance of the thus treated film was 90% and therefore kept unchanged, and the film was free from undesired coloration even when observed by naked eyes.

Reference Example 5

Synthesis of Polyimide

A 500 mL five-necked flask equipped with a thermometer, a stirrer, a nitrogen inlet tube, a dropping funnel with a bypass tube, a Dean-Stark apparatus and a condenser was charged with 18.4 g (0.05 mol) of 4,4'-bis(4-aminophenoxy)biphenyl (BAPB) and 85 g of N-methyl-2-pyrrolidone as a solvent under a nitrogen flow, and the contents of the flask were dissolved. Then, 11.2 g (0.05 mol) of 1,2,4,5-cyclohexane tetracarboxylic acid dianhydride synthesized in Reference Example 1 were added in split parts in a solid state as such to the resulting solution at room temperature over 1 hour, and the resulting mixture was stirred at room temperature for 2 hours. Next, 30.0 g of xylene as an azeotropic dehydration solvent were added to the mixture, and the obtained solution was heated to 180° C. and reacted at that temperature for 3 hours, and further xylene was refluxed with the Dean-Stark apparatus to separate water produced by azeotropy from the reaction solution. After 3 hours, it was confirmed that water was completely distilled off, and then the obtained reaction solution was heated to 190° C. over 1 hour to distil off and recover 29.0 g of xylene therefrom. Then, the contents of the flask were air-cooled until an inside temperature of the flask reached 60° C., and the resulting polyimide organic solvent solution was withdrawn therefrom. The thus obtained polyimide organic solvent solution was coated onto a glass plate, and heated on a hot plate at 90° C. for 1 hour to evaporate the solvent therefrom. The resulting coating layer was released from the glass plate to thereby obtain a self-supporting film. The resulting self-supporting film was fixed to stainless steel fixtures and heated in a hot air dryer at 220° C. for 2 hours to further evaporate the solvent therefrom, thereby obtaining a 100 µm-thick light-brown flexible film. As a result of measuring an IR spectrum of the resulting film, the characteristic absorption of an imide ring was observed at ν (C=O) 1773, 1702 (cm$^{-1}$). Therefore, it was determined that the film was formed of a polyimide containing a repeating unit represented by the following formula (D).

ired coloration even when observed by naked eyes. In addition, the polyimide film was subjected to high-energy light treatment in air (temperature: 60° C.) by irradiating the film with light from a 200 W high-pressure mercury lamp as a light source for 1000 hours to measure a total light transmittance thereof before and after the high-energy light treatment. As a result, it was also confirmed that the total light transmittance of the thus treated film was 90% and therefore kept unchanged, and the film was free from undesired coloration even when observed by naked eyes.

Reference Example 6

Synthesis of Polyimide

A 500 mL five-necked flask equipped with a thermometer, a stirrer, a nitrogen inlet tube, a dropping funnel with a bypass tube, a Dean-Stark apparatus and a condenser was charged with 12.1 g (0.035 mol) of 1,4-bis(4-amino-α,α-dimethylbenzyl)benzene (BisA-P), 4.0 g (0.015 mol) of 1-(4-aminophenyl)-1,3,3-trimethyl-1H-indene-5-amine (TMDA) and 85 g of N-methyl-2-pyrrolidone as a solvent under a nitrogen flow, and the contents of the flask were dissolved. Then, 11.2 g (0.05 mol) of 1,2,4,5-cyclohexane tetracarboxylic acid dianhydride synthesized in Reference Example 1 were added in split parts in a solid state as such to the resulting solution at room temperature over 1 hour, and the resulting mixture was stirred at room temperature for 2 hours. Next, 30.0 g of xylene as an azeotropic dehydration solvent were added to the mixture, and the obtained solution was heated to 180° C. and reacted at that temperature for 3 h, and further xylene was refluxed with the Dean-Stark apparatus to separate water produced by azeotropy from the reaction solution. After 3 hours, it was confirmed that water was completely distilled off, and then the obtained reaction solution was heated to 190° C. over 1 hour to distil off and recover 29.0 g of xylene therefrom. Then, the contents of the flask were air-cooled until an inside temperature of the flask reached 60° C., and the resulting polyimide organic solvent solution was withdrawn therefrom. The thus obtained polyimide organic solvent solution was coated onto a glass plate, and heated on a hot plate at 90° C. for 1 hour to evaporate the solvent therefrom. The resulting coating layer was released from the glass plate to thereby obtain a self-supporting film. The resulting self-sup-

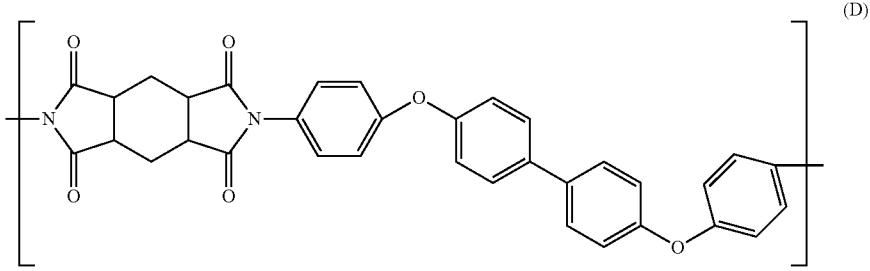

(D)

The obtained film had a glass transition temperature of 260° C. In addition, it was confirmed that the film had a total light transmittance as high as 90% as measured according to JIS K7105.

The polyimide film was heat-treated in air at 220° C. for 4 hours to measure a total light transmittance thereof before and after the heat treatment. As a result, it was confirmed that the total light transmittance of the heat-treated film was 90% and therefore kept unchanged, and the film was free from undesporting film was fixed to stainless steel fixtures and heated in a hot air dryer at 220° C. for 2 hours to further evaporate the solvent therefrom, thereby obtaining a 100 µm-thick light-brown flexible film. As a result of measuring an IR spectrum of the resulting film, the characteristic absorption of an imide ring was observed at ν (C=O) 1784, 1703 (cm$^{-1}$). Therefore, it was determined that the film was formed of a polyimide containing repeating units represented by the following formulae (E) and (E').

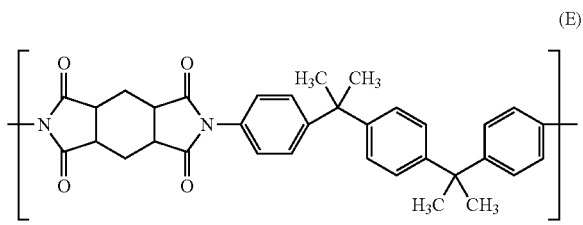

(E)

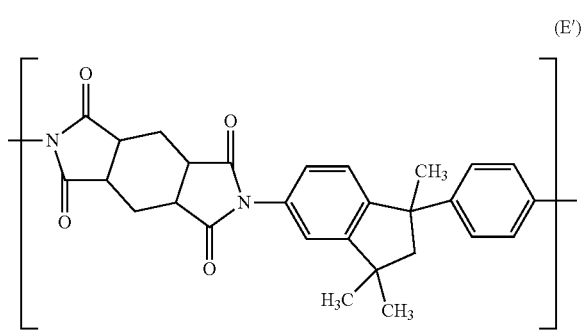

(E')

The obtained film had a glass transition temperature of 320° C. In addition, it was confirmed that the film had a total light transmittance as high as 91% as measured according to JIS K7105.

The polyimide film was heat-treated in air at 220° C. for 4 hours to measure a total light transmittance thereof before and after the heat treatment. As a result, it was confirmed that the total light transmittance of the heat-treated film was 91% and therefore kept unchanged, and the film was free from undesired coloration even when observed by naked eyes. In addition, the polyimide film was subjected to high-energy light treatment in air (temperature: 60° C.) by irradiating the film with light from a 200 W high-pressure mercury lamp as a light source for 1000 hours to measure a total light transmittance thereof before and after the high-energy light treatment. As a result, it was also confirmed that the total light transmittance of the thus treated film was 91% and therefore kept unchanged, and the film was free from undesired coloration even when observed by naked eyes.

Reference Example 7

Synthesis of Polyimide

A 500 mL five-necked flask equipped with a thermometer, a stirrer, a nitrogen inlet tube, a dropping funnel with a bypass tube, a Dean-Stark apparatus and a condenser was charged with 13.9 g (0.04 mol) of 9,9-bis(4-aminophenyl)fluorene (BAFL), 3.7 mol) (0.01 of 4,4'-bis(4-aminophenoxy)biphenyl (BAPB) and 85 g of N-methyl-2-pyrrolidone as a solvent under a nitrogen flow, and the contents of the flask were dissolved. Then, 11.2 g (0.05 mol) of 1,2,4,5-cyclohexane tetracarboxylic acid dianhydride synthesized in Reference Example 1 were added in split parts in a solid state as such to the resulting solution at room temperature over 1 hour, and the resulting mixture was stirred at room temperature for 2 hours. Next, 30.0 g of xylene as an azeotropic dehydration solvent were added to the mixture, and the obtained solution was heated to 180° C. and reacted at that temperature for 3 hours, and further xylene was refluxed with the Dean-Stark apparatus to separate water produced by azeotropy from the reaction solution. After 3 hours, it was confirmed that water was completely distilled off, and then the obtained reaction solution was heated to 190° C. over 1 hour to distil off and recover 29.0 g of xylene therefrom. Then, the contents of the flask were air-cooled until an inside temperature of the flask reached 60° C., and the resulting polyimide organic solvent solution was withdrawn therefrom. The thus obtained polyimide organic solvent solution was coated onto a glass plate, and heated on a hot plate at 90° C. for 1 hour to evaporate the solvent therefrom. The resulting coating layer was released from the glass plate to thereby obtain a self-supporting film. The resulting self-supporting film was fixed to stainless steel fixtures and heated in a hot air dryer at 220° C. for 2 hours to further evaporate the solvent therefrom, thereby obtaining a 100 μm-thick light-brown flexible film. As a result of measuring an IR spectrum of the resulting film, the characteristic absorption of an imide ring was observed at ν (C=O) 1775, 1703 (cm$^{-1}$). Therefore, it was determined that the film was formed of a polyimide containing repeating units represented by the following formulae (F) and (F').

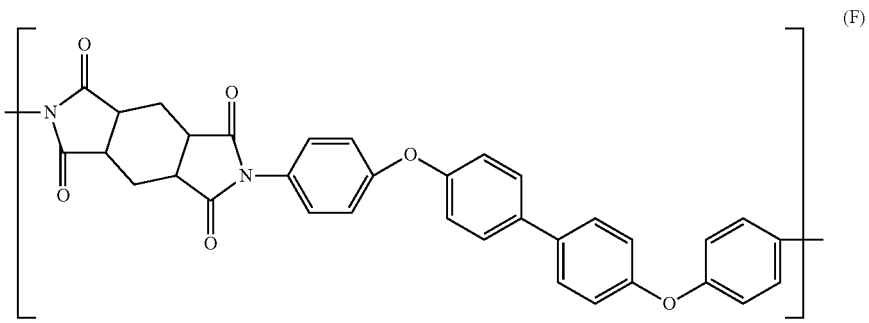

(F)

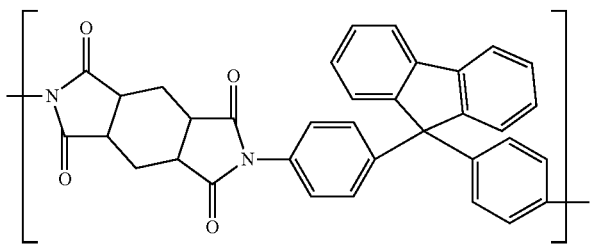

(F')

The obtained film had a glass transition temperature of 410° C. In addition, it was confirmed that the film had a total light transmittance as high as 90% as measured according to JIS K7105.

The polyimide film was heat-treated in air at 220° C. for 4 hours to measure a total light transmittance thereof before and after the heat treatment. As a result, it was confirmed that the total light transmittance of the heat-treated film was 90% and therefore kept unchanged, and the film was free from undesired coloration even when observed by naked eyes. In addition, the polyimide film was subjected to high-energy light treatment in air (temperature: 60° C.) by irradiating the film with light from a 200 W high-pressure mercury lamp as a light source for 1000 hours to measure a total light transmittance thereof before and after the high-energy light treatment. As a result, it was also confirmed that the total light transmittance of the thus treated film was 90% and therefore kept unchanged, and the film was free from undesired coloration even when observed by naked eyes.

reaction solution. After 3 hours, it was confirmed that water was completely distilled off, and then the obtained reaction solution was heated to 190° C. over 1 hour to distil off and recover 29.0 g of xylene therefrom. Then, the contents of the flask were air-cooled until an inside temperature of the flask reached 60° C., and the resulting polyimide organic solvent solution was withdrawn therefrom. The thus obtained polyimide organic solvent solution was coated onto a glass plate, and heated on a hot plate at 90° C. for 1 hour to evaporate the solvent therefrom. The resulting coating layer was released from the glass plate to thereby obtain a self-supporting film. The resulting self-supporting film was fixed to stainless steel fixtures and heated in a hot air dryer at 220° C. for 2 hours to further evaporate the solvent therefrom, thereby obtaining a 100 μm-thick light-brown flexible film. As a result of measuring an IR spectrum of the resulting film, the characteristic absorption of an imide ring was observed at ν (C=O) 1773, 1702 (cm$^{-1}$). Therefore, it was determined that the film was formed of a polyimide containing a repeating unit represented by the following formula (G).

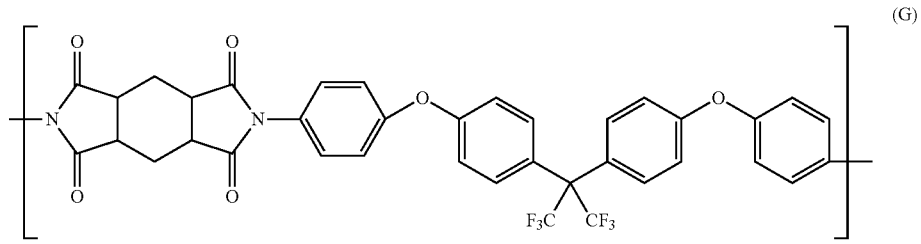

(G)

Reference Example 8

Synthesis of Polyimide

A 500 mL five-necked flask equipped with a thermometer, a stirrer, a nitrogen inlet tube, a dropping funnel with a bypass tube, a Dean-Stark apparatus and a condenser was charged with 25.9 g (0.05 mol) of 2,2-bis[4-(4-aminophenoxy)phenyl]hexafluoropropane and 85 g of N-methyl-2-pyrrolidone as a solvent under a nitrogen flow, and the contents of the flask were dissolved. Then, 11.2 g (0.05 mol) of 1,2,4,5-cyclohexane tetracarboxylic acid dianhydride synthesized in Reference Example 1 were added in split parts in a solid state as such to the resulting solution at room temperature over 1 hour, and the resulting mixture was stirred at room temperature for 2 hours. Next, 30.0 g of xylene as an azeotropic dehydration solvent were added to the mixture, and the obtained solution was heated to 180° C. and reacted at that temperature for 3 hours, and further xylene was refluxed with the Dean-Stark apparatus to separate water produced by azeotropy from the The obtained film had a glass transition temperature of 260° C. In addition, it was confirmed that the film had a total light transmittance as high as 91% as measured according to JIS K7105.

The polyimide film was heat-treated in air at 220° C. for 4 hours to measure a total light transmittance thereof before and after the heat treatment. As a result, it was confirmed that the total light transmittance of the heat-treated film was 91% and therefore kept unchanged, and the film was free from undesired coloration even when observed by naked eyes. In addition, the polyimide film was subjected to high-energy light treatment in air (temperature: 60° C.) by irradiating the film with light from a 200 W high-pressure mercury lamp as a light source for 1000 hours to measure a total light transmittance thereof before and after the high-energy light treatment. As a result, it was also confirmed that the total light transmittance of the thus treated film was 91% and therefore kept unchanged, and the film was free from undesired coloration even when observed by naked eyes.

Example 1

A palladium catalyst-added polysilazane-containing xylene solution (available from AZ Electronic Materials) was coated by a dip-coating method on a 200 μm-thick film obtained from the polyimide organic solvent solution synthesized in Reference Example 4, and dried at 120° C. for 10 minutes, thereby forming a 1.5 μm-thick polysilazane film layer on both surfaces of the polyimide film. Further, the thus coated film was subjected to calcination treatment at 180° C. for 30 minutes to form a 1.5 μm-thick silicon oxide layer, thereby producing a transparent heat-resistant gas-barrier film. The thus produced film was measured and evaluated for a water vapor transmission rate, a total light transmittance, a haze, a glass transition temperature and surface smoothness thereof. The evaluation results are shown in Table 1.

Example 2

The same procedure as in Example 1 was repeated except that the calcination treatment was carried out at 200° C. for 30 minutes, thereby obtaining a film of Example 2. The evaluation results are shown in Table 1.

Example 3

The same procedure as in Example 1 was repeated except that the calcination treatment was carried out at 250° C. for 30 minutes, thereby obtaining a film of Example 3. The evaluation results are shown in Table 1.

Example 4

A palladium catalyst-added polysilazane-containing xylene solution (available from AZ Electronic Materials) was coated by a dip-coating method on a 200 μm-thick film obtained from the polyimide organic solvent solution synthesized in Reference Example 2, and dried at 120° C. for 10 minutes, thereby forming a L5 μm-thick polysilazane film layer on both surfaces of the polyimide film. Further, the thus coated film was subjected to calcination treatment at 180° C. for 30 minutes to form a 1.5 μm-thick silicon oxide layer, thereby producing a transparent heat-resistant gas-barrier film. The thus produced film was measured and evaluated for a water vapor transmission rate, a total light transmittance, a haze, a glass transition temperature and surface smoothness thereof. The evaluation results are shown in Table 1.

Example 5

The same procedure as in Example 4 was repeated except that the calcination treatment was carried out at 200° C. for 30 minutes, thereby obtaining a film of Example 5. The evaluation results are shown in Table 1.

Example 6

The same procedure as in Example 4 was repeated except that the calcination treatment was carried out at 250° C. for 30 minutes, thereby obtaining a film of Example 6. The evaluation results are shown in Table 1.

Comparative Example 1

The same procedure as in Example 4 was repeated except that the palladium catalyst-added polysilazane solution was replaced with an alkoxysilicate-metal alcoholate solution, thereby obtaining a film of Comparative Example 1. The evaluation results are shown in Table 1.

Comparative Example 2

The same procedure as in Example 4 was repeated except that no calcination treatment was carried out, thereby obtaining a film of Comparative Example 2. The evaluation results are shown in Table 1.

Comparative Example 3

The same procedure as in Example 4 was repeated except that the calcination treatment was carried out at 150° C. for 30 minutes, thereby obtaining a film of Comparative Example 3. The evaluation results are shown in Table 1.

Comparative Example 4

A 0.4 μm-thick $SiO_2$ film layer was formed at 200° C. by a sputtering method on both surfaces of a 200 μm-thick film obtained from the polyimide organic solvent solution synthesized in Reference Example 2. The thus obtained film was measured and evaluated for a water vapor transmission rate, a total light transmittance, a haze, a glass transition temperature and surface smoothness thereof. The evaluation results are shown in Table 1.

TABLE 1

| | Water vapor transmission rate | Total light transmittance | Haze | Glass transition temperature | Surface smoothness | | |
|---|---|---|---|---|---|---|---|
| | $g/m^2/day$ | % | % | ° C. | Ra (nm) | P-V (nm) | Rz (nm) |
| Example 1 | 8.71 | 91.77 | 0.46 | 261 | 3.2 | 39.2 | 25.3 |
| Example 2 | 6.62 | 91.71 | 0.45 | 260 | 2.9 | 40.3 | 28.2 |
| Example 3 | 4.75 | 91.02 | 0.45 | 261 | 3.6 | 46.2 | 30.2 |
| Example 4 | 4.98 | 91.93 | 0.14 | 301 | 3.5 | 40.2 | 26.2 |
| Example 5 | 4.57 | 91.93 | 0.13 | 300 | 3.3 | 39.9 | 25.2 |
| Example 6 | 2.23 | 91.75 | 0.15 | 301 | 3.7 | 43.6 | 27.4 |
| Comparative Example 1 | 186.92 | 93.50 | 0.24 | 301 | — | — | — |
| Comparative Example 2 | 60.98 | 91.17 | 0.19 | 298 | — | — | — |
| Comparative Example 3 | 34.11 | 91.80 | 0.20 | 300 | — | — | — |
| Comparative Example 4 | 1.37 | 90.89 | 0.32 | 300 | 5.8 | 68.5 | 52.2 |

From the results shown in Table 1, it was confirmed that the films obtained Examples 1 to 6 had good properties, in particular, an excellent water vapor-barrier property, whereas the films obtained Comparative Examples 1 to 3 which failed to satisfy the production conditions as defined by the present invention were deteriorated in properties, in particular, a water vapor-barrier property. In addition, it was confirmed that the film produced in Comparative Example 4 by a sputtering method exhibited an excellent water vapor-barrier property, but was considerably deteriorated in surface smoothness.

INDUSTRIAL APPLICABILITY

In the process for producing a transparent heat-resistant gas-barrier film according to the present invention, it is possible to produce a film having a high heat resistance and a good gas-barrier property without need of a large size facility. Therefore, the production process of the present invention is highly practical and useful as a method for producing an optical member or an electronic device member which are required to have a good gas-barrier property, at low costs.

The invention claimed is:

1. A process for producing a transparent heat-resistant gas-barrier film, comprising the steps of:
   coating a polysilazane-containing solution onto at least one surface of a transparent polyimide film formed of a polyimide containing a repeated unit represented by the formula (I):

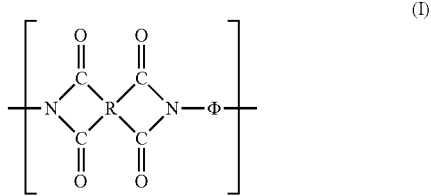

(I)

wherein R is a $C_4$ to $C_{10}$ tetravalent group having a cyclic structure, an acyclic structure or both a cyclic structure and an acyclic structure; and φ is a $C_2$ to $C_{39}$ divalent linking group containing an aliphatic structural unit, an alicyclic structural unit, an aromatic structural unit, an organosiloxane structural unit or a combination or a repeating structure of these structural units, and may contain at least one group selected from the group consisting of —O—, —$SO_2$—, —CO—, —$CH_2$—, —$C(CH_3)_2$—, —$C_2H_4O$— and —S— in a main chain thereof; and
   calcining the coated solution at a temperature of 180° C. or higher to laminate a silicon oxide layer obtained by the calcination on the transparent polyimide film.

2. The process for producing a transparent heat-resistant gas-barrier film according to claim 1, wherein the transparent polyimide film has a glass transition temperature of 250° C. or higher as measured by a differential scanning calorimetry and a total light transmittance of 80% or more.

3. The process for producing a transparent heat-resistant gas-barrier film according to claim 1, wherein R in the formula (I) is a tetravalent group formed by removing four hydrogen atoms from cyclohexane.

4. The process for producing a transparent heat-resistant gas-barrier film according to claim 1, wherein the silicon oxide layer has a thickness of from 0.1 to 2.0 μm.

5. The process for producing a transparent heat-resistant gas-barrier film according to claim 1, wherein the polysilazane-containing solution comprises a palladium catalyst.

6. The process for producing a transparent heat-resistant gas-barrier film according to claim 1, further comprising the step of laminating a layer formed of silicon oxide and/or silicon oxynitride on the silicon oxide layer by a physical vapor deposition method or a chemical vapor deposition method.

7. The process for producing a transparent heat-resistant gas-barrier film according to claim 1, further comprising the step of laminating a transparent conductive film layer formed of a mixture of indium oxide and tin oxide or a transparent conductive film layer formed of zinc oxide on the silicon oxide layer.

8. The process for producing a transparent heat-resistant gas-barrier film according to claim 1, wherein the transparent heat-resistant gas-barrier film is used as a member for electronic devices.

* * * * *